United States Patent
Nomoto et al.

(10) Patent No.: US 10,244,196 B2
(45) Date of Patent: Mar. 26, 2019

(54) DISPLAY CONTROL APPARATUS AND DISPLAY CONTROL METHOD

(71) Applicant: CANON KABUSHIKI KAISHA, Tokyo (JP)

(72) Inventors: Atsuo Nomoto, Tokyo (JP); Wataru Suzuki, Tokorozawa (JP); Akihiro Takamura, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 14/626,761

(22) Filed: Feb. 19, 2015

(65) Prior Publication Data

US 2015/0244967 A1    Aug. 27, 2015

(30) Foreign Application Priority Data

Feb. 21, 2014   (JP) .................................. 2014-032211

(51) Int. Cl.
| | |
|---|---|
| *H04N 5/74* | (2006.01) |
| *G06F 3/01* | (2006.01) |
| *G06F 3/0482* | (2013.01) |
| *H04N 21/41* | (2011.01) |
| *H04L 12/18* | (2006.01) |
| *H04N 21/472* | (2011.01) |
| *H04N 7/15* | (2006.01) |
| *H04M 3/56* | (2006.01) |

(52) U.S. Cl.
CPC ........... *H04N 5/7408* (2013.01); *G06F 3/011* (2013.01); *G06F 3/0482* (2013.01); *H04L 12/1822* (2013.01); *H04L 12/1827* (2013.01); *H04N 21/4122* (2013.01); *H04N 21/47214* (2013.01); *H04M 3/567* (2013.01); *H04N 7/15* (2013.01)

(58) Field of Classification Search
CPC .............. H04N 5/7408; H04L 12/1822; H04L 12/1827
See application file for complete search history.

(56) References Cited

U.S. PATENT DOCUMENTS

| | | | |
|---|---|---|---|
| 2005/0033805 A1* | 2/2005 | Fujiyama | H04L 12/1813 709/204 |
| 2009/0195708 A1* | 8/2009 | Yada | H04L 12/1827 348/744 |

FOREIGN PATENT DOCUMENTS

| | | |
|---|---|---|
| JP | H05316107 A | 11/1993 |
| JP | 2006-333158 A | 12/2006 |
| JP | 2008-191919 A | 8/2008 |
| JP | 2008-250620 A | 10/2008 |
| JP | 2010-282245 A | 12/2010 |
| WO | 2013054462 A1 | 4/2013 |

* cited by examiner

*Primary Examiner* — Michael A Faragalla
*Assistant Examiner* — Chayce R Bibbee
(74) *Attorney, Agent, or Firm* — Canon U.S.A., Inc. IP Division

(57) ABSTRACT

A projector that displays a video image based on display data obtains procedure information corresponding to a procedure of a plurality of user operations performed to identify display data and displays a video image indicating the obtained procedure information.

10 Claims, 12 Drawing Sheets

FIG. 6

EXECUTABLE OPERATION PROCEDURES — 405

| No | DATE | TIME | OPERATION PROCEDURE | PC NAME |
|---|---|---|---|---|
| 1 | 20XX/6/2 | 12:00 | A⇒B⇒C | ★PC150 |
| 2 | 20XX/6/2 | 10:00 | A⇒B | ★PC160 |
| 3 | — | — | A⇒B | PC150 |
| 4 | 20XX/6/1 | 17:00 | A⇒B | ★PC150 |

408 (pointer to row 1)

NONEXECUTABLE OPERATION PROCEDURES — 44

| | | | A⇒B⇒C | PC160 | IN SHORT OF RESOURCE: C |
| 5 |
| 6 | ... | ... | ... | ... | ... |
| ... |
| N | | | | PC170 | NOT ACCESSIBLE |

406

DESCRIPTION OF OPERATIONS — 407
A: OPEN MATERIAL STORAGE LOCATION N BY FILER O
B: OPEN MATERIAL L BY SLIDE VIEWER M
C: OPEN IMAGE P BY IMAGE VIEWER Q

DISPLAY CONTROL APPARATUS AND DISPLAY CONTROL METHOD

BACKGROUND

Field

Aspects of the present invention generally relate to a display control apparatus that performs display control on an image used in a conference.

Description of the Related Art

In corporations, presentations are made by a display apparatus displaying materials including images and characters, such as a projector and a display. The materials to be displayed are often stored in a storage device of an information apparatus that performs a presentation or a storage device on a network (for example, a file server). In such cases, the user of the information apparatus accesses the storage area to display the materials by inputting, to the information apparatus, locations (network paths) where the materials are stored before the start of the presentation.

Methods for reducing a complicated procedure of such operations prior to a presentation have been known. For example, Japanese Patent Application Laid-Open No. 5-316107 discusses a technique by which conference holding information associating the name of a conference with the keynote of the conference, the names of conference materials, and the storage locations of the conference materials can be shared in advance between terminals participating in the conference for smooth conferencing.

However, the procedure for designating images to be displayed can be cumbersome and complicated.

For example, when using the method discussed in Japanese Patent Application Laid-Open No. 5-316107, the conference holding information needs to be generated and delivered to the terminals participating in the conference in advance. This requires a lot of labor.

Further, for example, if a participant attends a conference with an information apparatus different from the one expected to be used in the conference, a troublesome operation may be necessary to designate files to be projected in the conference, or share conference information.

SUMMARY

According to an aspect of the present invention, a projector includes an acquisition unit configured to obtain information for identifying a user operation performed to display a video image obtained via a network, and a display control unit configured to display the video image based on the obtained information.

Further features of the present disclosure will become apparent from the following description of exemplary embodiments with reference to the attached drawings.

BRIEF DESCRIPTION OF THE DRAWINGS

FIG. 6 is a diagram illustrating an example of procedure information.

DESCRIPTION OF THE EMBODIMENTS

Figure 1:
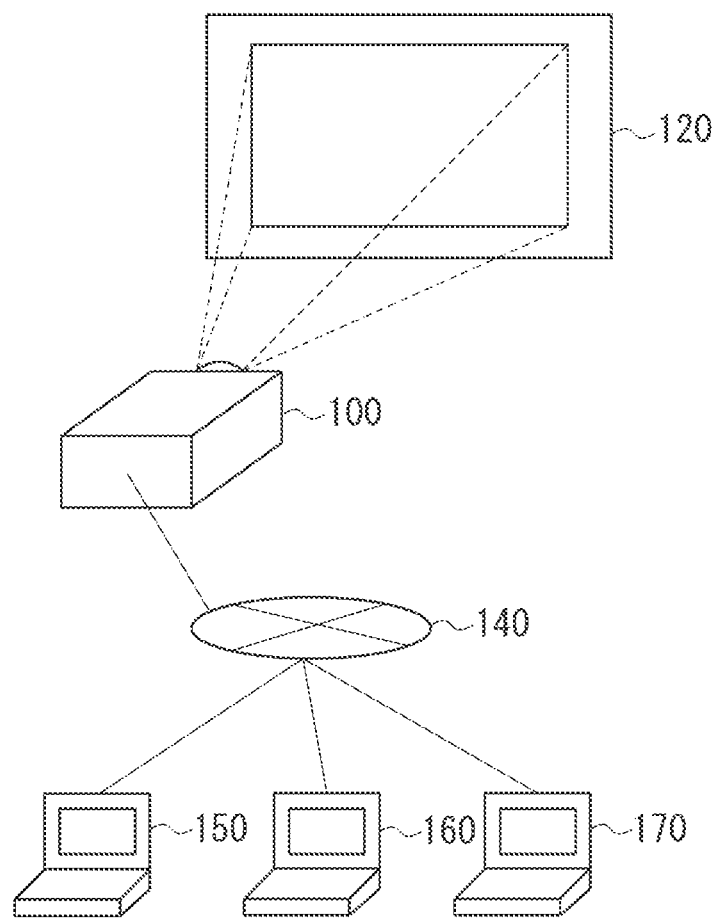
FIG. 1 is an overall configuration diagram of a system according to a first exemplary embodiment.

Various exemplary embodiments will be described in detail below with reference to the drawings.

Referring to the drawings, a first exemplary embodiment will be described in detail below.

<Overall Configuration>

FIG. 1 is a diagram conceptually illustrating an overall configuration of a system according to the present exemplary embodiment. The system according to the present exemplary embodiment includes a projector 100 which is a type of display control apparatus, a screen 120 on which an image is projected, a network 140, and personal computers (PCs) 150, 160, and 170 which are a type of information apparatus. The projector 100 and the PCs 150, 160, and 170 are each connected to the network 140 and can perform data communication with each other. The projector 100 receives display data from at least one of the PCs 150, 160, and 170, and projects a video image according to the display data on the screen 120. While the present exemplary embodiment deals with a configuration including three PCs 150, 160, and 170, the number of PCs is not limited thereto and may be other numbers.

The projector 100 according to the present exemplary embodiment is a control apparatus for displaying a video image based on display data. The display control apparatus is not limited to a projector. For example, a liquid crystal display or a cathode-ray tube (CRT) display may be used.

In the present exemplary embodiment, the PCs 150, 160, and 170 are employed as an example of the information apparatus. Other examples of the information apparatus may include a tablet PC and a mobile phone.

In the present exemplary embodiment, the projector 100 receives the display data via the network 140. However, this is not restrictive. For example, the projector 100 may receive the display data not via the network 140 but through a direct connection such as a Universal Serial Bus (USB) connection. The network 140 may be wired or wireless.

<Hardware Configuration>

Figure 2:
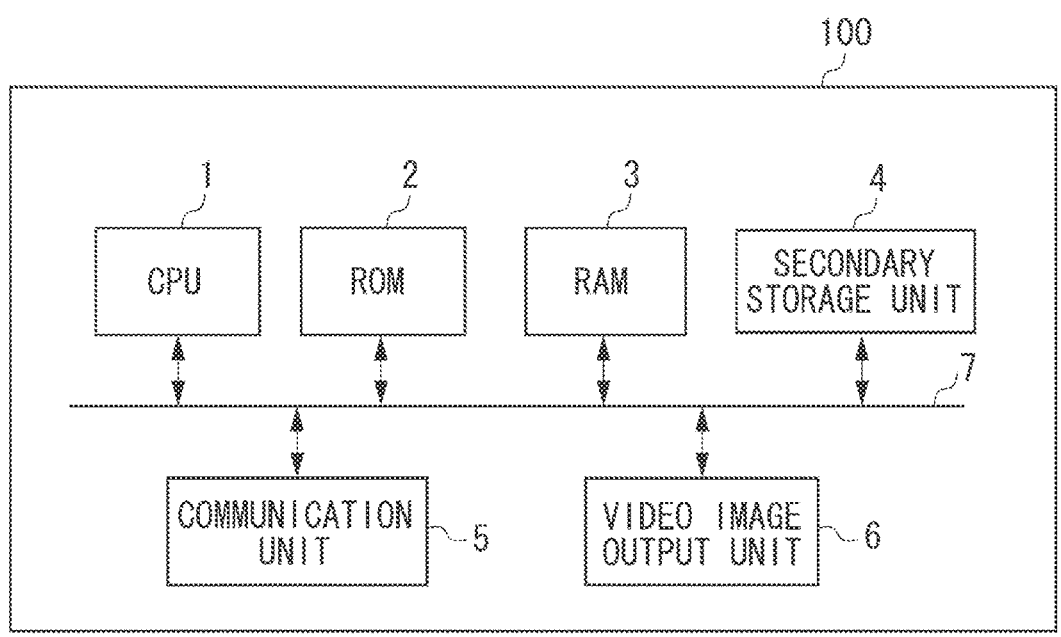
FIG. 2 is a hardware configuration diagram of a projector.

FIG. 2 illustrates an example of a hardware configuration of the projector 100. As illustrated FIG. 2, the projector 100 includes a central processing unit (CPU) 1, a read-only memory (ROM) 2, a random access memory (RAM) 3, a secondary storage unit 4, a communication unit 5, a video image output unit 6, and a connection bus 7. The CPU 1 executes a control program stored in the ROM 2 and/or the RAM 3 to control the projector 100. The ROM 2 is a nonvolatile memory. The ROM 2 stores the control program and various types of parameter data.

The control program, executed by the CPU 1, causes the projector 100 to function as a unit for performing various types of processing to be described below. The RAM 3 is a volatile memory. The RAM 3 temporarily stores image data, the control program, and execution results thereof. The secondary storage unit 4 is a rewritable secondary storage unit such as a hard disk and a flash memory. The secondary storage unit 4 stores data to be used in the control program and various settings.

The communication unit 5 is a wireless communication unit. The communication unit 5 communicates with other projectors and PCs via the network 140. The communication unit 5 may be a wired communication unit. The video image output unit 6 includes a lamp and a projection lens of a typical projector. The video image output unit 6 projects and displays on the screen 120 display data obtained from the RAM 3 or the communication unit 5 and execution results of the control program. The video image output unit 6 may be another display control unit such as a liquid crystal display or a CRT display. The connection bus 7 is a data bus for connecting the units in the projector 100 to mutually input/output data.

The PCs 150, 160, and 170 have a hardware configuration similar to that of a typical PC. The hardware configurations of the apparatuses are not limited thereto. Other hardware configurations may be used as long as the processing to be described below can be executed.

In the present exemplary embodiment, the processing to be described below is implemented when the CPUs of the apparatuses execute control programs (software). Part or all of the processing may be implemented by hardware devices. A dedicated circuit (application specific integrated circuit (ASIC)) or a processor (reconfigurable processor or digital signal processor (DSP)) may be used as the hardware. Further, the projector 100 may obtain a program (software) from various storage media connected to the network 140 via the communication unit 5 and execute the program. Each of the PCs 150, 160, and 170 has an operating system (OS) installed thereon, and performs the processing to be described below under the control of the OS.

Figure 3:
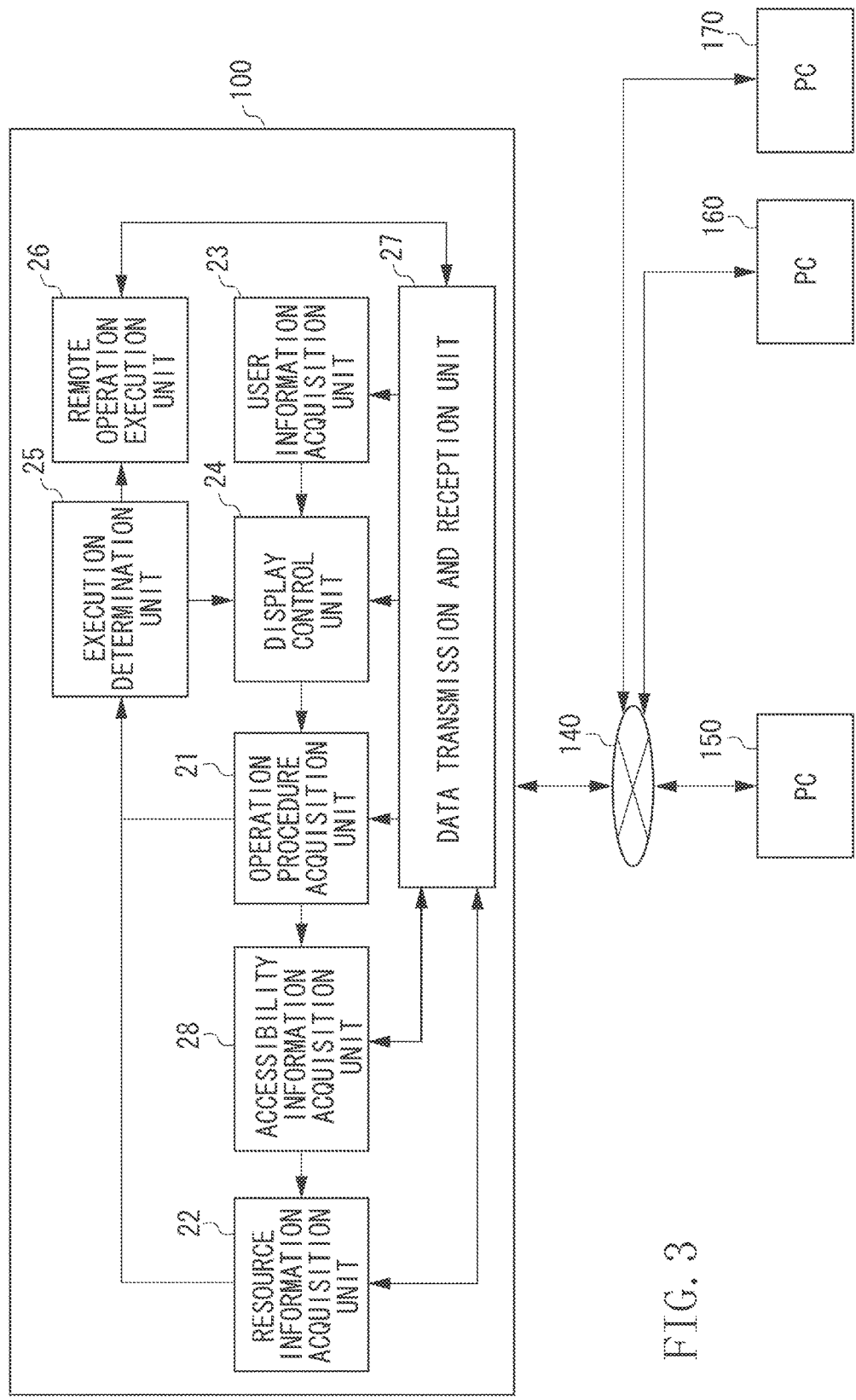
FIG. 3 is a functional block diagram of the system according to the first exemplary embodiment.

FIG. 3 is a block diagram illustrating an example of a functional configuration of a control program according to the present exemplary embodiment. In particular, FIG. 3 illustrates the functional configuration of the control program of the projector 100. As described above, the apparatuses (projector 100 and PCs 150, 160, and 170) are connected to the network 140 and can communicate with each other.

The projector 100 includes an operation procedure acquisition unit 21, a resource information acquisition unit 22, a user information acquisition unit 23, a display control unit 24, an execution determination unit 25, a remote operation execution unit 26, a data transmission and reception unit 27, and an accessibility information acquisition unit 28. The functional blocks connected to the data transmission and reception unit 27 can transmit and receive data to/from the other apparatuses (PCs 150, 160, and 170) via the network 140.

First, the functional configuration of the projector 100 will be described. The following description deals mainly with an example where the projector 100 is receiving display data from the PC 150 among the PCs 150, 160, and 170 illustrated in FIG. 1 and projecting a video image.

The operation procedure acquisition unit 21 obtains information (procedure information) about operation procedures stored in the secondary storage unit 4, and outputs the procedure information to the execution determination unit 25 and the accessibility information acquisition unit 28. The procedure information according to the present exemplary embodiment includes information about a history of past operations performed on the PCs 150, 160, and 170 by users to identify display data. In the present exemplary embodiment, information that associates information about the contents of the operations by the users with user information, PC information, and information about operation date and time are stored in the secondary storage unit 4 of the projector 100 as procedure information. The information about the contents of the operations may include the filename (file name) of an electronic file and information about a storage location (network path) of the electronic file.

The information about the contents of the operations may also include information for identifying software (application) activated to display a video image, and options and arguments at the time when the software is activated. Examples of the options and arguments include "read-only" to open an electronic file in a read-only mode, and "presentation mode" to open an electronic file in a presentation mode. Examples of the user information (identification information about a user) include a user identifier (ID). Examples of the PC information (identification information about a PC) include a PC name and a network address. Details of the procedure information will be described below with reference to FIG. 6. The operation procedure acquisition unit 21 outputs the obtained procedure information to the accessibility information acquisition unit 28 and the execution determination unit 25.

The present exemplary embodiment mainly describes an example where the information about an operation procedure associates the contents of operations with the user information at the time of operations, the PC information, and the information about the operation date and time. However, the procedure information is not limited to such an example. For example, the PC information and/or the operation date and time may be excluded from the procedure information.

Using the PC information (for example, network address) included in the procedure information obtained from the operation procedure acquisition unit 21, the accessibility information acquisition unit 28 obtains information about the accessibility of the PC. The accessibility information acquisition unit 28 according to the present exemplary embodiment issues a predetermined inquiry to the apparatuses in the network 140 via the data transmission and reception unit 27, and obtains accessibility information according to the presence or absence of a response to the inquiry. The accessibility information acquisition unit 28 outputs the information about the accessibility of the apparatuses (PCs 150, 160, and 170) to the resource information acquisition unit 22 in, but not limited to, a list format.

Based on the accessibility information obtained from the accessibility information acquisition unit 28, the resource information acquisition unit 22 requests resource information from a PC or PCs accessible to the projector 100 among the PCs 150, 160, and 170 connected to the network 140. The resource information acquisition unit 22 then outputs resource information obtained from the accessible PC(s) to the execution determination unit 25 along with the identification information about the PC(s).

In the present exemplary embodiment, the resource information refers to information about processing that the PC(s) can execute. Specifically, the resource information may include information about installed software, information indicating whether a specific piece of software is installed, and information about the presence or absence of the right of access to a specific device. The resource information is not limited to such examples. For example, information indicating the hardware configuration or the hardware performance of a PC may be included.

The execution determination unit 25 refers to the resource information obtained from the resource information acquisition unit 22, and determines whether each piece of procedure information obtained from the operation procedure acquisition unit 21 is executable. The determination criteria will be described below. The execution determination unit 25 outputs procedure information determined to be executable to the display control unit 24 and the remote operation execution unit 26. In the meantime, the user information acquisition unit 23 obtains user information (for example, a login user ID of the PC 150) from the PC 150 which is the source of transmission of the currently-projected display data, and outputs the obtained user information to the display control unit 24. The user information is an ID number set to enable personal identification. An OS login name and a device name of the PC 150 may be used in combination as the user information. Other information may be used as long as the information can identify the user who is operating the PC. Examples include face information, iris information, and fingerprint information. Additional hardware such as an imaging unit is needed to obtain and authenticate such information.

The display control unit 24 receives the display data from the PC 150 and projects a video image on the screen 120 by using the video image output unit 6. The display control unit 24 determines procedure information to display on the screen 120 based on the procedure information obtained from the execution determination unit and the user information obtained from the user information acquisition unit 23. The display control unit 24 according to the present exemplary embodiment displays, on the screen 120, procedure information associated with the user information obtained from the user information acquisition unit 23, among the pieces of procedure information obtained from the execution determination unit (procedure information determined to be executable). The display control unit 24 can display a plurality of pieces of procedure information on the screen 120.

The remote operation execution unit 26 obtains user operations on the PC 150. The remote operation execution unit 26 transmits a remote operation signal to the PC 150 in response to a user input that designates specific procedure information from among the procedure information displayed on the screen 120. For example, if the procedure information designated by the user is executable by the PC 150, the remote operation execution unit 26 transmits to the PC 150 a remote operation signal for making the PC 150 perform processing similar to that at the time when the user makes the operation corresponding to the designated procedure information. By transmitting the remote operation signal, the remote operation execution unit 26 performs control to display a video image according to the procedure information.

The data transmission and reception unit 27 realizes communications with various apparatuses connected via the network 140. The network 140 may be wired or wireless. The data transmission and reception unit is capable of, for example, USB communications in addition to communications via the network 140.

Next, a functional configuration of the PC 150 will be described.

The PC 150 includes typical PC functions.

The PC 150 includes a communication function, and transmits various types of data in response to requests from the projector 100.

The PC 150 has dedicated software installed thereon, whereby functions of collecting and transmitting the resource information about the PC 150, and receiving the remote operation signal and executing processing in response to the remote operation signal are implemented.

The PC 150 includes a function of generating display data. The CPU 150 transmits the generated display data to the projector 100 by using the communication function.

The PCs 160 and 170 include functions similar to those of the PC 150.

<Presentation of Procedure Information and Execution Flow>

Figure 4:
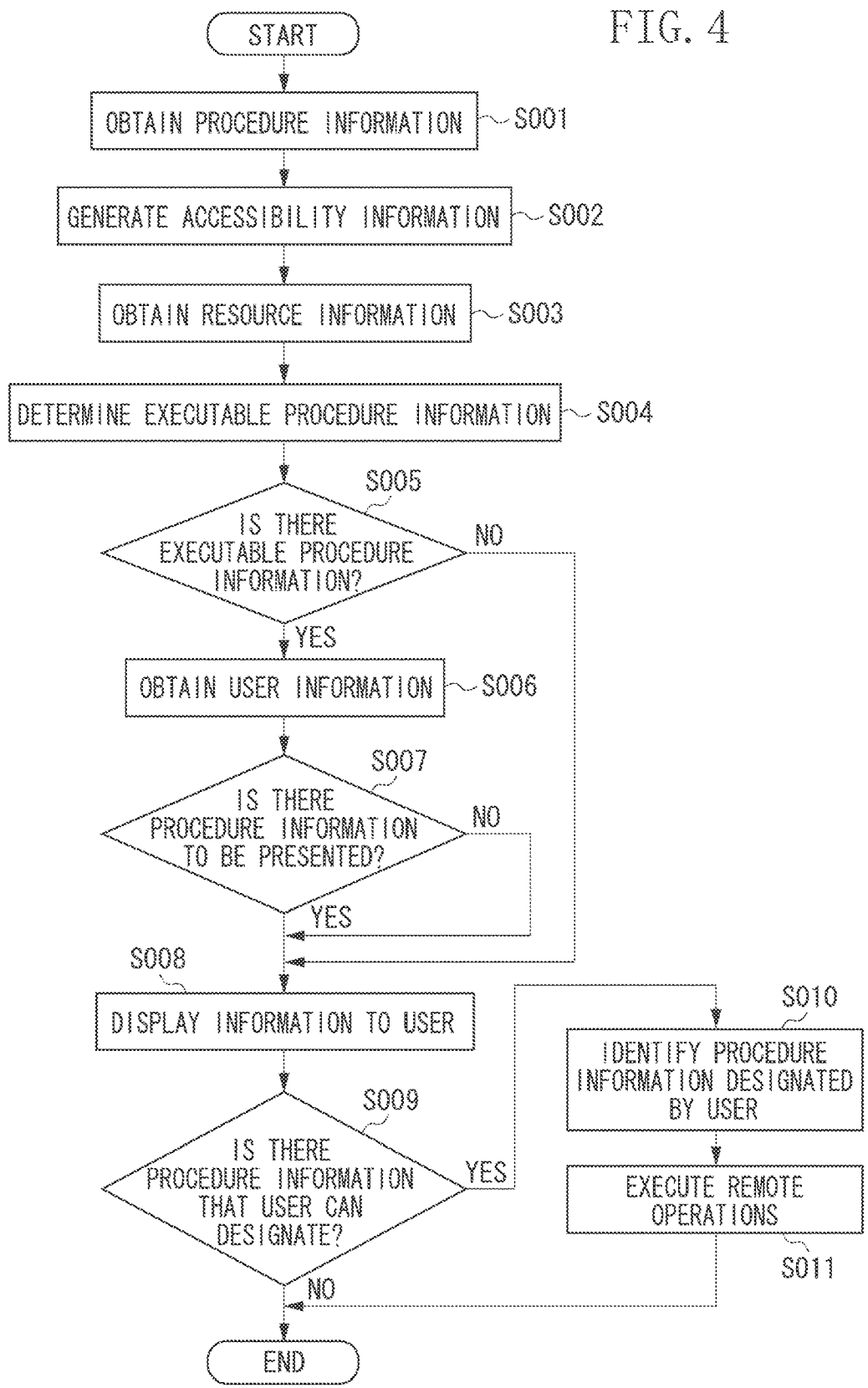
FIG. 4 is a flowchart for describing an operation of the projector according to the first exemplary embodiment.

FIG. 4 is a flowchart in which the display control apparatus (projector 100) according to the present exemplary embodiment presents the procedure information to the user and controls the display of the display data according to user instructions. The processing to be performed by the display control apparatus will be described in detail with reference to FIG. 4. The operation in FIG. 4 starts at timing that the projector 100 starts projecting a video image on the screen 120 based on the display data generated by the PC 150.

In step S001, the operation procedure acquisition unit 21 obtains the procedure information from the secondary storage unit 4. The procedure information according to the present exemplary embodiment associates information about the contents of operations users have performed on the PCs 150, 160, and 170 in the past with the user information at the time of operations (identification information about the users), the information about the operated PCs 150, 160, and 170 (PC information), and the information about the operation date and time. The information about the contents of the operations includes the contents of a plurality of user operations such that the order of the operations can be identified. For example, suppose that a user opened folder A and then opened file B in folder A to start a presentation. In such a case, the information about the contents of the operations includes the contents of at least the two operations in such a manner that the order of the operations can be identified. In other words, the procedure information according to the present exemplary embodiment includes information about a procedure of a plurality of user operations performed to identify the display data. The procedure by which the projector 100 stores the procedure information in the secondary storage unit 4 will be described below. The operation procedure acquisition unit 21 outputs the obtained procedure information to the accessibility information acquisition unit 28 and the execution determination unit 25.

In step S002, the accessibility information acquisition unit 28 determines whether each PC corresponding to the PC information included in the procedure information is currently accessible to the projector 100, and generates accessibility information as a result of determination. The accessibility information according to the present exemplary embodiment is information of list format in which the PC information (identification information about the PCs 150, 160, and 170) is associated with information indicating accessibility. The accessibility information may be configured to include only identification information about an accessible PC or PCs. The accessibility information does not need to be in a list format. The accessibility information acquisition unit 28 outputs the generated accessibility information to the resource information acquisition unit 22.

In step S003, the resource information acquisition unit 22 obtains the resource information about the PC(s) in which the accessibility information indicates the accessibility. The resource information acquisition unit 22 may inquire of the PC(s) about the resource information at the timing of step S003. Alternatively, the resource information may be stored in the secondary storage unit 4 of the projector 100 in advance, and the resource information acquisition unit 22 may obtain the resource information from the secondary storage unit 4. The resource information acquisition unit 22 outputs the obtained resource information to the execution determination unit 25. In step S004, the execution determination unit 25 determines executable procedure information among the pieces of procedure information obtained in step S001 by using the resource information.

The execution determination unit 25 according to the present exemplary embodiment determines executable procedure information in the following manner. Suppose that a plurality of pieces of procedure information is obtained from the operation procedure acquisition unit 21. The execution determination unit 25 identifies software needed to perform an operation corresponding to first procedure information. If there is a PC on which the identified software is fully installed and that is accessible from the projector 100, the execution determination unit 25 determines that the operation corresponding to the first procedure information is executable. The execution determination unit 25 can determine whether second procedure information and third procedure information are executable as is the case with the first procedure information.

The method for determining whether procedure information is executable is not limited to the foregoing. For example, the execution determination unit 25 may determine that procedure information is executable if a PC on which a predetermined number of pieces (or predetermined proportion) of the identified software are installed is accessible. For example, the execution determination unit 25 may determine that procedure information is executable if a PC on which predetermined software is installed is accessible. If the resource information includes information about hardware configuration and/or performance, the execution determination unit 25 may determine whether procedure information is executable depending on the presence or absence and/or performance of a specific piece of hardware. The CPU use rate of a PC and/or the amount of traffic of the network 140 may be used as a determination criterion.

In step S005, the display control unit 24 determines whether there is executable procedure information as a result of the determination in step S004. If there is no executable procedure information (NO in step S005), then in step S008, the display control unit 24 displays a message that there is no executable procedure information. Such display enables the user to know that though it is determined whether procedure information is currently executable with respect to the history of users' past operations, there is no executable procedure information. The absence of executable procedure information does not need to be displayed.

If there is at least one piece of executable procedure information (YES in step S005), then in step S006, the user information acquisition unit 23 obtains the user information about the PC 150 (identification information about the user). In the present exemplary embodiment, the user information is the user ID of the user who is currently logging in the PC 150.

In step S007, the display control unit 24 determines whether there is procedure information to be presented to the current user of the PC 150 in the executable procedure information. Specifically, the display control unit 24 determines that, among one or a plurality of pieces of procedure information determined to be executable by the execution determination unit 25, procedure information associated with the identification information about a predetermined user is the information to be presented to the user. In the description of the present exemplary embodiment, the predetermined user refers to the user indicated by the user information of the PC 150.

If there is no procedure information to be presented to the user (NO in step S007), then in step S008, the display control unit 24 displays to that effect. Such display enables the user to know that though it is determined whether there is procedure information to be presented to the user, there is no procedure information to be presented. The absence of procedure information to be presented to the user does not need to be displayed.

If there is at least one piece of procedure information to be presented (YES in step S007), then in step S008, the display control unit 24 displays the procedure information to be presented. As described above, the procedure information includes the identification information (PC information) about the PC having executed the procedure information in the past and the information about the date and time when the operation has been previously executed. The display control unit 24 displays all such information.

Figure 5:
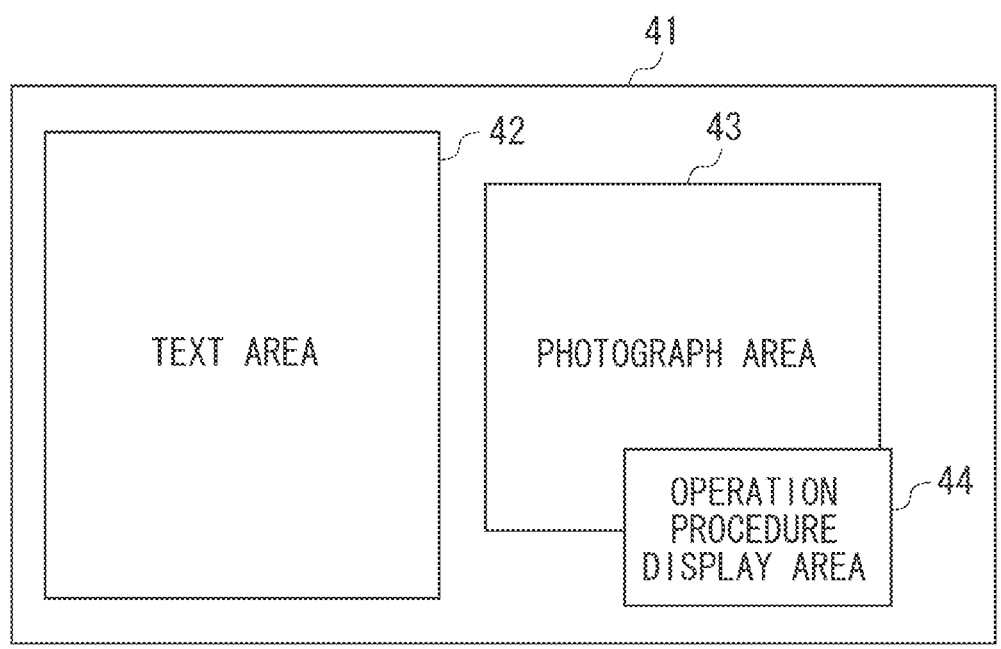
FIG. 5 is a diagram illustrating an example of a display screen.

FIG. 5 is a schematic diagram illustrating an example where procedure information is displayed along with a display video image including a text area and a photograph area. FIG. 5 illustrates a display video image 41 including a text area 42, a photograph area 43, and an operation procedure display area 44. The display video image 41 represents the entire display video image which the projector 100 projects. The operation procedure display area 44 displays procedure information. The text area 42 and the photograph area 43 display the contents displayed on the display of the PC 150. The area for presenting procedure information (operation procedure display area 44) is a predetermined area defined in advance. In the example of FIG. 5, procedure information is displayed in the predetermined position, so that the photograph area 43 and the operation procedure display area 44 overlap each other.

The display control unit 24 according to the present exemplary embodiment sets the default display position of the operation procedure display area 44 at the bottom right corner. If the display control unit 24 displays the operation procedure display area 44 while displaying the text area 42 and/or the photograph area 43, the display control unit 24 can dynamically change the layout such that the areas do not overlap. More specifically, the display control unit 24 performs structural analysis of the display data to identify the text area 42 and the photograph area 43, and controls the projection position of the operation procedure display area 44 such that the operation procedure display area 44 does not overlap with the identified areas. The display control unit 24 can also change the size of the operation procedure display area 44. Instead of moving the position of and/or reducing the size of the operation procedure display area 44, the display control unit 24 may move the position of and/or reduce the text area 42 and/or the photograph area 43.

FIG. 6 is a schematic diagram illustrating a specific example of the procedure information obtained from the secondary storage unit 4 and displayed in the operation procedure display area 44 in FIG. 5. As illustrated in FIG. 6, the operation procedure display area 44 includes executable operation procedures 405, nonexecutable operation procedures 406, a description of operations 407, and a cursor 408. The operation procedures 405 and 406 illustrated in FIG. 6 each display procedure information corresponding to operations that the user currently using the PC 150 has performed on any of the PCs 150, 160, and 170 in the past.

The executable operation procedures 405 include the date and time of the operations that the user currently using the PC 150 has performed in the past, the contents of the operations, and the PC information (identification information about the PCs, such as PC names).

The procedure information may be displayed including the user's mouse operations (for example, information about a drag, double click, and right click) and keyboard operations (for example, information about a character string input for a file search). The date and time of operation start, the date and time of operation completion, and the date and time of activation or termination of specific software may be written as the information about the date and time of an operation the user has performed in the past.

The operation procedure acquisition unit 21 according to the present exemplary embodiment obtains, from the PCs 150, 160, and 170 information about operation contents related to operations that users have performed on the PCs 150, 160, and 170 so that the projector 100 projects a video image, and obtains information about the users (for example, identification information about the login users at the time of operations). The operation procedure acquisition unit 21 then associates the information about the operation contents with the user information, and stores the resultant in the secondary storage unit 4 as procedure information.

For example, suppose that the projector 100 is connected with the PC 150 and a display image indicated on the display of the PC 150 is projected by the projector 100. In such a state, the user information acquisition unit 23 obtains the current user information (identification information about the login user) about the PC 150. The display control unit 24 then displays procedure information associated with the current user information about the PC 150 among the currently executable pieces of procedure information. In the meantime, the display control unit 24 according to the present exemplary embodiment does not project procedure information associated with user information different from the current user information about the PC 150 even if the procedure information is currently executable. In such a manner, information security and privacy can be protected.

The foregoing mode is not restrictive. For example, the pieces of user information may be grouped and procedure information corresponding to the same group of user information may be projected. For example, security levels may be set to the procedure information, and procedure information about operations performed by others in the past may be projected if the procedure information satisfies a condition concerning the security level. The user may be able to edit or delete procedure information. Pieces of stored procedure information that are not designated for a certain period may be deleted. FIG. 6 illustrates a plurality of pieces of procedure information which is listed at the top to the bottom in descending order of the date and time of operation. The display control unit 24 can thus control the display position of the procedure information such that the pieces of procedure information corresponding to operations performed on date and time closer to the present time are displayed in a predetermined position.

Return to the description of the executable operation procedures 405. In FIG. 6, the operations in the operation procedure field are displayed in abbreviations. The specific processing of the operations denoted by the abbreviations is described in the description of operations 407. A PC name marked with a star in the PC name field indicates that the procedure information has been executed by the PC of the PC name in the past. A PC name without a star indicates that the procedure information has not been executed yet and is currently executable by the PC of the PC name. In this example, four pieces of executable procedure information are displayed. The row No. 2 indicates that the operations corresponding to the procedure information "A→B" have been executed by the PC 160 in the past and are currently executable by the PC 160 again. The row No. 3 indicates that the operations have not been executed by the PC 150 yet and are executable also by the PC 150.

The nonexecutable operation procedures 406 describe currently nonexecutable procedure information among the pieces of procedure information corresponding to the operations that have been executed by the current login user of the PC 150 in the past. FIG. 6 illustrates an example where the PC 160 does not have resource for continuously executing operations A, B, and C. The row No. N indicates that the PC 170 is not accessible from the projector 100 for some reason.

The description of operations 407 describes the operations denoted by abbreviations in the executable operation procedures 405 and the nonexecutable operation procedures 406. Each operation is described by a combination of software to be activated and data (for example, filename) to be used. The cursor 408 is a cursor with which the user designates procedure information to be actually executed from among the pieces of executable procedure information. The user makes inputs to move the cursor 408 and designate the procedure information to be executed, whereby remote operations are executed. Specifically, the display control unit 24 displays first procedure information about first operations (operations A, B, and C) that the user has performed on the PC 150 to identify first display data (display data of image P). The display control 24 further displays second procedure information about second operations (operations A and B) that the user has performed on the PC to identify second display data (display data of material L). The remote operation execution unit 26 then performs control (transmission of a remote control signal) to display the first display data (the display data of image P) according to the input of a user instruction after the first procedure information and the second procedure information have been displayed.

In the example of FIG. 6, nonexecutable procedure information is displayed as well. However, nonexecutable procedure information may be hidden. Whether to display nonexecutable procedure information can be switched by a user In step S009, the remote operation execution unit 26 determines whether there is procedure information that the user can designate. If there is no procedure information that the user can designate (NO in step S009), the remote operation execution unit 26 ends the processing of FIG. 4.

If there is procedure information that the user can designate (YES in step S009), then in step S010, the remote operation execution unit 26 identifies the procedure information designated by the user based on user inputs. If the user does not designate the procedure information, the remote operation execution unit 26 ends the processing of FIG. 4.

In step S011, the remote operation execution unit 26 transmits a remote operation signal for executing the operations corresponding to the procedure information designated by the user to the PC corresponding to the PC information included in the designated procedure information. Take, for example, the case where the remote operation signal is transmitted to the PC 150. The remote operation execution unit 26 initially transmits the remote operation signal to the PC 150. The PC 150 then executes the operations described in the received remote operation signal. When the remote operation execution unit 26 receives an acknowledgment response to the remote operation signal from the PC 150, the remote operation execution unit 26 ends the processing of FIG. 4. The remote operation execution unit 26 may end the processing of FIG. 4 at timing that the transmission of the remote operation signal is completed.

The present exemplary embodiment has dealt with the case where the user designates a piece of procedure information and performs remote operations. However, the user may designate a plurality of pieces of procedure information, and a plurality of remote operation signals corresponding to the plurality of pieces of procedure information may be transmitted in designated order. For example, suppose that the user designates first procedure information and then designates second procedure information. In such a case, the projector 100 may transmit a remote operation signal corresponding to the first procedure information and then transmit a remote operation signal corresponding to the second procedure information.

As described above, the display control apparatus (projector 100) according to the present exemplary embodiment presents to the user information (procedure information) about past operation procedures performed on the information apparatus (PCs 150, 160, and 170) and controls display images.

<Storage Flow of Procedure Information>

Next, processing at the time of storing procedure information about the information apparatuses into the display control apparatus (the second storage unit 4 of the projector 100) will be described. The present exemplary embodiment deals with an example of storing procedure information at the time when the PC 150 is operated to display a video image for a presentation.

Figure 7:
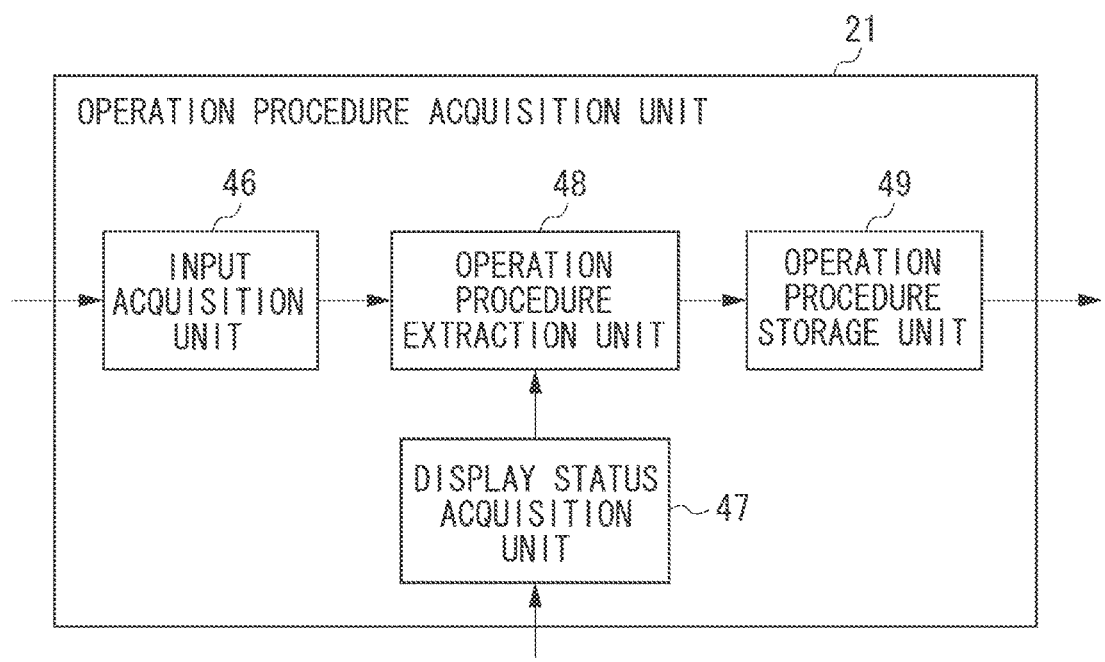
FIG. 7 is a functional block diagram of an operation procedure acquisition unit.

FIG. 7 is a block diagram illustrating a functional configuration of the operation procedure acquisition unit 21. As illustrated FIG. 7, the operation procedure acquisition unit 21 includes an input acquisition unit 46, a display status acquisition unit 47, an operation procedure extraction unit 48, and an operation procedure storage unit 49.

The input acquisition unit 46 obtains user inputs from the PC 150. A user input refers to information about an operation that the user performs on the PC 150 by using a mouse and/or a keyboard.

The display status acquisition unit 47 obtains display presence/absence information from the display control unit 24. The display presence/absence information refers to information indicating whether a predetermined video image is projected. An example of the predetermined video image is a screen of a presentation application. The display status acquisition unit 47 may obtain the display presence/absence information from the PC 150.

The operation procedure extraction unit 48 refers to the display presence/absence information obtained from the display status acquisition unit 47 and extracts procedure information from the user inputs obtained from the input acquisition unit 46. The purpose of extracting the procedure information is to estimate the start time of the presentation and extract only preparation operations prior to the start time.

Figure 8:
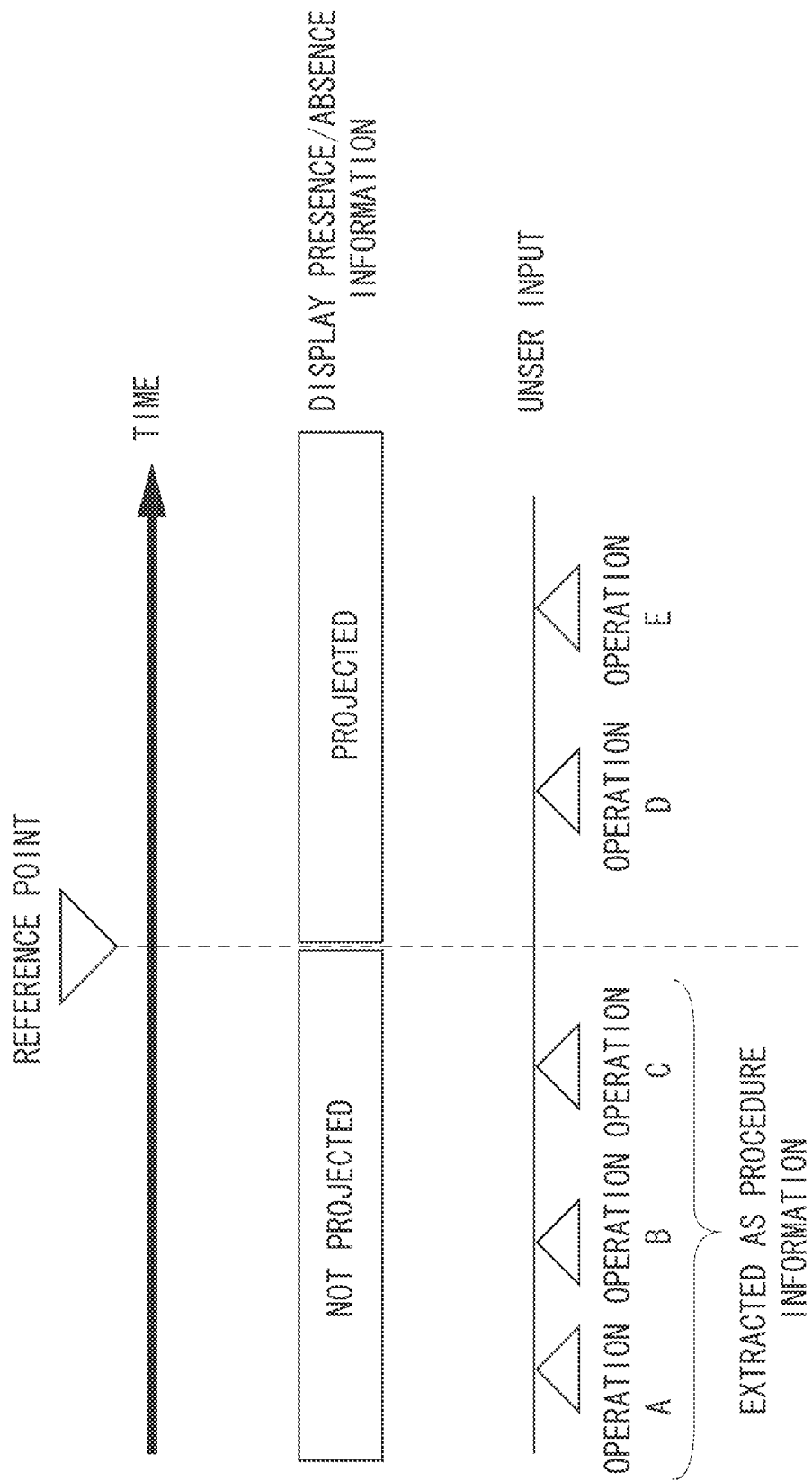
FIG. 8 is a diagram for explaining an example of a method for extracting the procedure information.

FIG. 8 is a schematic diagram illustrating a method for extracting an operation procedure. A specific method will be described below with reference to FIG. 8. FIG. 8 illustrates the display presence/absence information and user inputs, with time on the horizontal axis. FIG. 8 illustrates operations A to E which are obtained by the input acquisition unit 46 as user inputs. The display status acquisition unit 47 refers to the display presence/absence information, estimates the time when the projection of the predetermined video image is started, i.e., the timing that "not projected" changes to "projected" as a presentation start time, and defines the time as a reference point. The operation procedure extraction unit 48 regards user inputs within a predetermined time before the reference point as operations for preparation prior to the presentation, and extracts the user inputs as procedure information. In the example of FIG. 8, operations A, B, and C within a predetermined time before the reference point are extracted as procedure information. Operations D and E are excluded from the procedure information.

Operations A to E of FIG. 8 represent user inputs for activating specific pieces of software. For example, operation A represents an operation for opening folder A. Operation B represents an operation for opening file B. Operation C represents an operation for another file C. Inputs for stopping software (closing a file) are excluded from the user inputs to be obtained.

The foregoing description has dealt with the case where the operations within a predetermined time before the reference point are extracted as the procedure information. However, such an example is not restrictive. For example, preparation operations for a presentation may be performed in the "projected" state. User input within a predetermined time after the reference point, as well as before the reference point, may thus be extracted as the procedure information. All user inputs from the power-on of the PC 150 to the reference point may be extracted as the procedure information.

The user may determine a reference point by performing a predetermined operation serving as a cue for starting a presentation, and user input within a predetermined time before the reference point may be extracted as the procedure information. By defining as a reference point the timing that an instruction to change a screen mode (presentation mode) of presentation material display software is input, user input within a predetermined time before the reference point may be extracted as the procedure information. A predetermined number of user inputs made before a reference point may be extracted as the procedure information.

In the example illustrated in FIG. 8, operation C may be deliberately excluded from the procedure information while operations A and B are included in the procedure information. This is particularly effective, for example, in such situations that the user opens the same folder via the same network path at each regular conference and opens the latest electronic file in the folder. In other words, the user may want to open the folder opened in the last conference but not the electronic file opened in the last conference. Such a function can be implemented as intended by the user.

The operation procedure storage unit 49 obtains the procedure information from the operation procedure extraction unit 48 and stores the procedure information in the secondary storage unit 4. The stored procedure information is output to the execution determination unit 25 or the accessibility information acquisition unit 28 in response to request.

Figure 9:
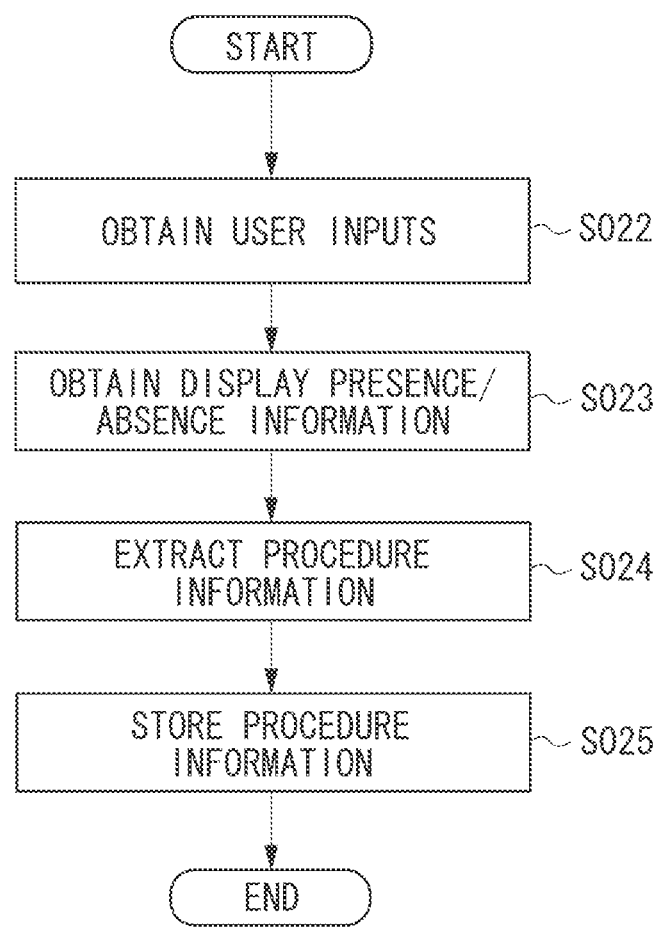
FIG. 9 is a flowchart for describing a procedure for storing the procedure information according to the first exemplary embodiment.

FIG. 9 is a flowchart for describing an operation for storing the procedure information into the secondary storage unit 4 of the projector 100. A flow of the operation of the present exemplary embodiment will be described with reference to FIG. 9. The processing of FIG. 9 is started when the projector 100 and the PC 150 start communication. Before the projector 100 and the PC 150 start communication, user input to the PC 150 is stored in the PC 150.

In step S022, the input acquisition unit 46 of the operation procedure acquisition unit 21 obtains user input made to the PC 150. More specifically, the input acquisition unit 46 initially obtains information about user input that has been performed on the PC 150 before the connection of the projector 100 with the PC 150 is started. The input acquisition unit 46 then obtains user input to the PC 150 at regular time intervals.

In step S023, the display status acquisition unit 47 obtains display presence/absence information indicating whether a video image is displayed. The display control unit 24 may generate the display presence/absence information and output the generated resultant to the display status acquisition unit 47. The PC 150 may generate and output the display presence/absence information to the display status acquisition unit 47.

In step S024, the operation procedure extraction unit 48 refers to the display presence/absence information to identify the reference point described in FIG. 8, and extracts procedure information from the user inputs based on the reference point. The procedure information is extracted by the method described above. In step S025, the operation procedure storage unit 49 stores the procedure information extracted in step S024 into the secondary storage unit 4.

The above is an example of the operation for storing the procedure information about an information apparatus (PC) into the display control apparatus (projector 100).

The present exemplary embodiment has described the case where the user performs a presentation by using the PC 150. The projector 100 can extract and store procedure information also about other PCs (for example, PCs 160 and 170) in the same manner as the PC 150.

The foregoing description has dealt with the case where the operation procedure extraction unit 48 extracts the procedure information based on the display presence/absence information that indicates whether a predetermined video image is displayed. However, this is not restrictive. For example, the operation procedure extraction unit 48 may obtain, as display presence/absence information, time information indicating display start timing of a predetermined video image instead of the foregoing display presence/absence information, and extract procedure information based on the time information.

As described above, the display control apparatus (projector 100) according to the present exemplary embodiment stores, as procedure information, user operations that the user has performed on the information apparatuses (PCs 150, 160, and 170) to display a video image in the past. The display control apparatus then presents the stored procedure information, and a PC or PCs execute operations corresponding to the procedure information designated by the user. With such a configuration, past operations by the user can be easily reproduced to smoothly start and proceed with a presentation or conference.

In the present exemplary embodiment, the display control apparatus (projector 100) is configured to store the procedure information and the resource information in a centralized manner. Accordingly, the effect of reducing traffic and cost can be expected as compared with the case where a dedicated server is provided.

Next, a second exemplary embodiment will be described with an emphasis on differences from the first exemplary embodiment.

The second exemplary embodiment deals with a case where the information about the information apparatuses (PCs) such as procedure information, resource information, accessibility information, and user information are stored in a server in a centralized manner.

Figure 10:
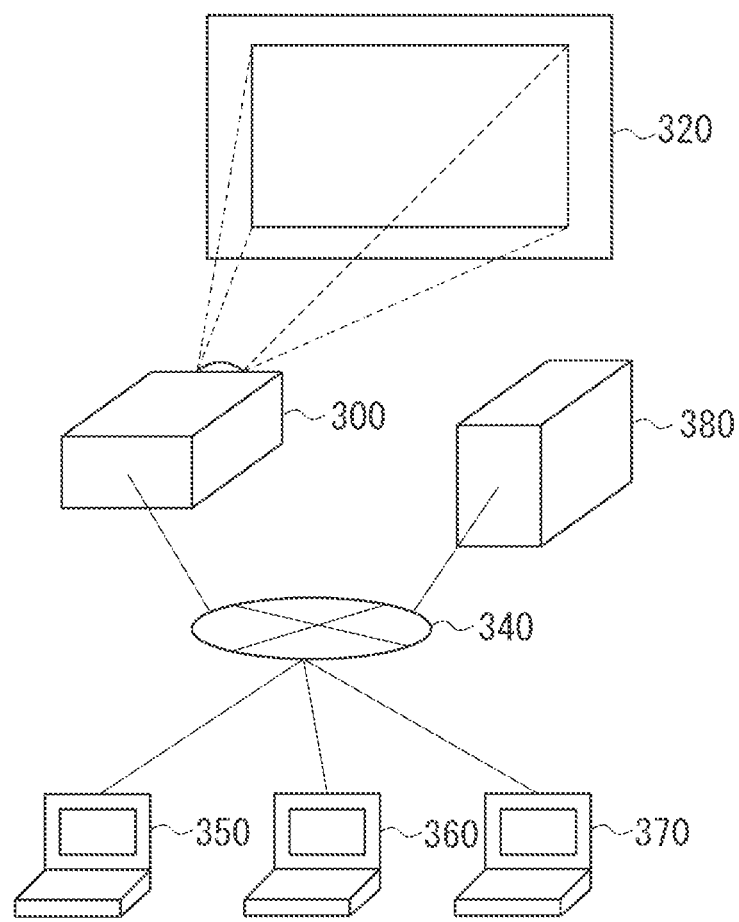
FIG. 10 is an overall configuration diagram of a system according to a second exemplary embodiment.

FIG. 10 is an overall configuration diagram including a display control apparatus according to the present exemplary embodiment. As illustrated in FIG. 10, the system according to the present exemplary embodiment includes a projector 300 which is a type of display control apparatus, a screen 320 on which a video image is projected, a network 340, and PCs 350, 360, and 370 and a server 380 which are a type of information apparatuses. The projector 300, the PCs 350, 360, and 370, and the server 380 are each connected to the network 340 and can communicate data with each other. The projector 300 receives a display video image from at least one of the PCs 350, 360, and 370, and projects the display video image on the screen 320. The server 380 is a server for storing resource information and accessibility information about the PCs 350, 360, and 370. While the system according to the present exemplary embodiment is configured to include one projector, three PCs, and one server for ease of description, the numbers are not limited thereto. Different numbers of units or apparatuses may also be adopted.

Like the first exemplary embodiment, the present exemplary embodiment deals mainly with an example where the display control apparatus is a projector. However, the display control apparatus may be a liquid crystal display or a CRT display. The present exemplary embodiment also deals with the case where the information apparatuses include PCs. However, information apparatuses such as a table PC and a mobile telephone may be used.

The projector 300 serving as the display control apparatus according to the present exemplary embodiment can be implemented with a hardware configuration similar to that of FIG. 2. The server 380 (information apparatus) according to the present exemplary embodiment has a hardware configuration including that of FIG. 2 and a display video image generation unit 67.

The display video image generation unit 67 is a graphical processing unit (GPU). The display video image generation unit 67 generates a video image to be displayed by the video image output unit 6.

The video image output unit 6 is a liquid crystal display (LCD). The video image output unit 6 displays the video image generated by the display video image generation unit 67. The PCs 350, 360, and 370 can be implemented with a hardware configuration similar to that of the PCs 150, 160, and 170 according to the first exemplary embodiment. The hardware configurations of the apparatuses are not limited thereto. Other hardware configurations may be used as long as the processing to be described below can be executed.

In the present exemplary embodiment, like the first exemplary embodiment, the processing to be described below is implemented by software by using the CPUs of the apparatuses. Part or all of the processing may be implemented by hardware devices. The software related to the present exemplary embodiment may be obtained via the network 340 by using the communication units included in the apparatuses.

Figure 11:
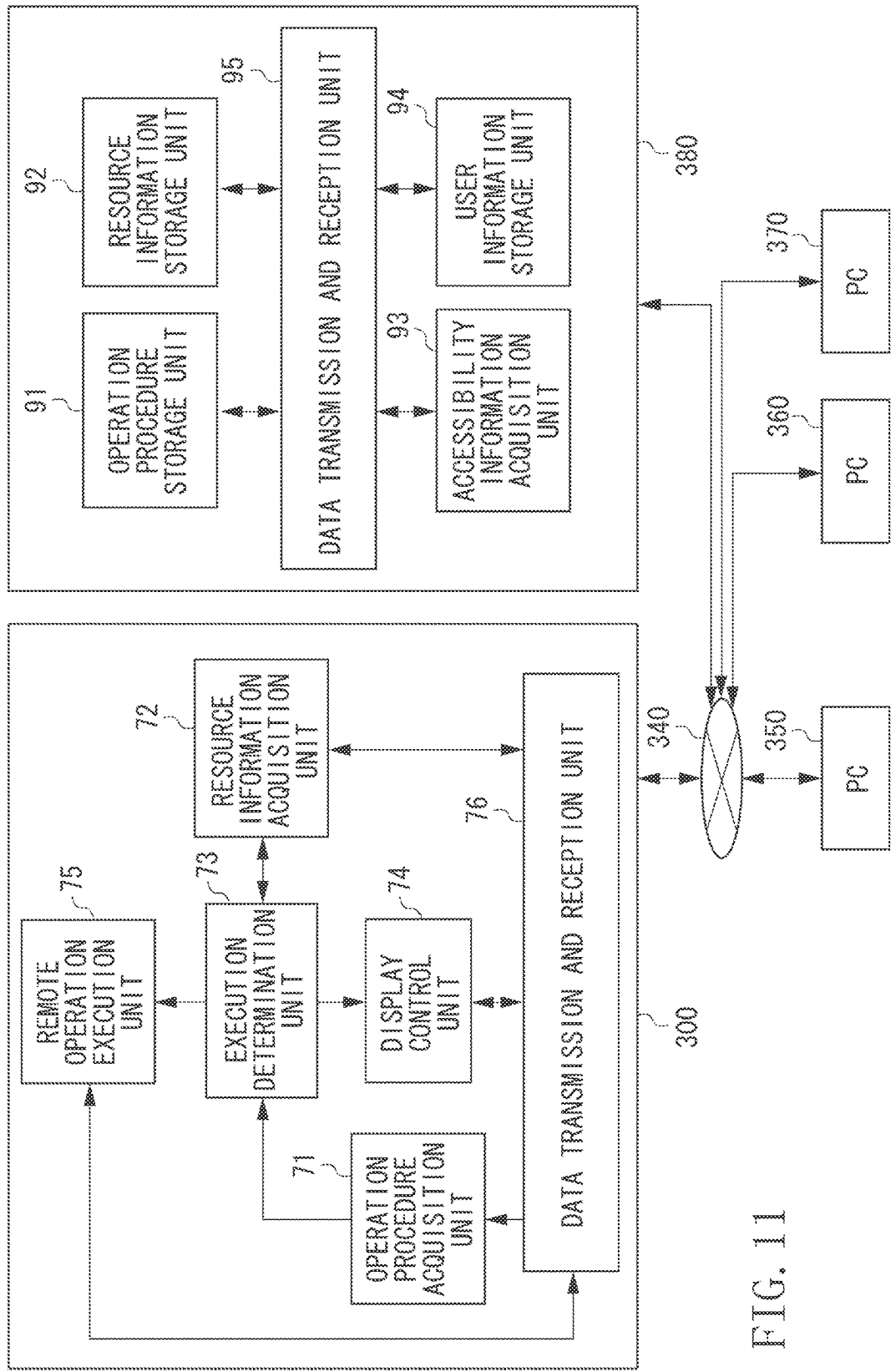
FIG. 11 is a functional block diagram of the system according to the second exemplary embodiment.
Figure 12:
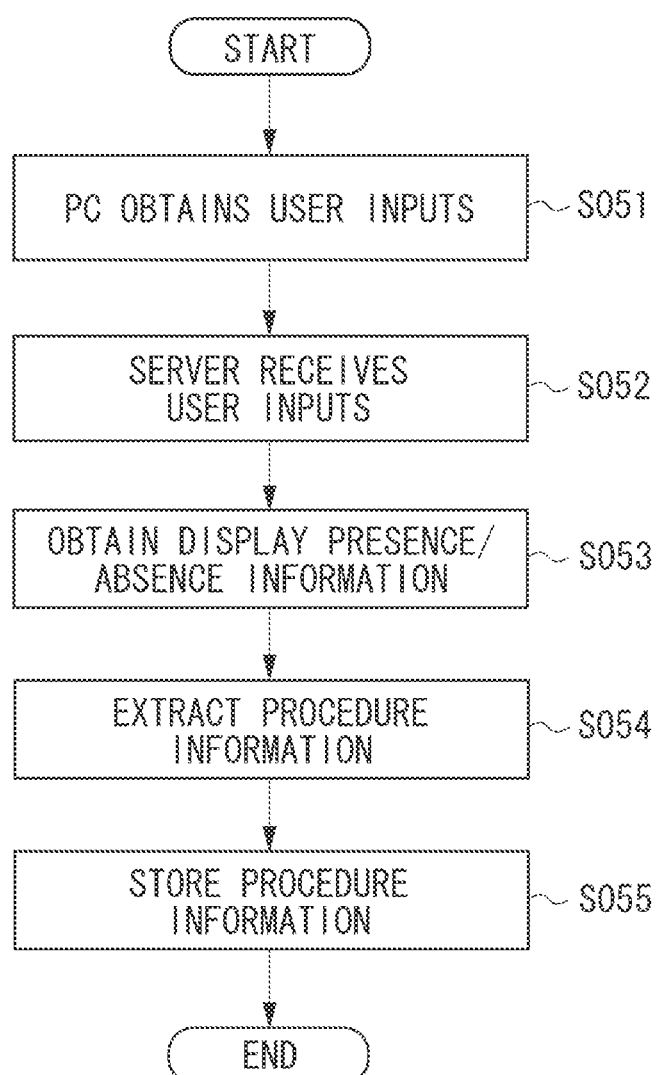
FIG. 12 is a flowchart for describing a procedure for storing procedure information according to the second exemplary embodiment.

FIG. 11 is a diagram illustrating an example of a functional configuration of control programs according to the present exemplary embodiment. In particular, FIG. 11 illustrates the functional configuration of the projector 300 and the server 380. The present exemplary embodiment deals with an example where the projector 300 is receiving display data on the display screen of the PC 350 among the PCs 350, 360, and 370, and projecting a video image depending on the display data.

The projector 300 includes an operation procedure acquisition unit 71, a resource information acquisition unit 72, an execution determination unit 73, a display control unit 74, a remote operation execution unit 75, and a data transmission and reception unit 76. The PC 350 has functions similar to those of the PC 150.

The server 380 includes an operation procedure storage unit 91, a resource information storage unit 92, an accessibility information acquisition unit 93, a user information storage unit 94, and a data transmission and reception unit 95.

The functional configuration of the projector 300 will initially be described.

The operation procedure acquisition unit 71 obtains procedure information from the operation procedure storage unit 91 of the server 380 via the network 340 and outputs the procedure information to the execution determination unit 73.

The resource information acquisition unit 72 obtains resource information from the resource information storage unit 92 of the server 380 via the network 340 and outputs the resource information to the execution determination unit 73. The server 380 outputs to the resource information acquisition unit 72 resource information about an information apparatus or apparatuses (PC(s) 350, 360, and/or 370) determined to be accessible accessible by the accessibility information acquisition unit 93, by associating the resource information with identification information (PC information) about the information apparatus(es).

The execution determination unit 73 refers to the resource information and determines currently executable procedure information among the pieces of procedure information obtained from the server 380.

The display control unit 74 receives the display data from the PC 350 and projects a video image on the screen 320 by using the video image output unit 6. The display control unit 74 determines whether there is executable procedure information, based on the procedure information obtained from the execution determination unit 73. If it is determined that there is executable procedure information, the display control unit 74 obtains the current user information about the PC 350 from the user information storage unit 94 of the server 380. Based on the user information obtained from the user information storage unit 94, the display control unit 74 then presents procedure information that the user corresponding to the user information has performed in the past.

Next, the functional configuration of the server 380 will be described.

The operation procedure storage unit 91 obtains user input to the PCs 350, 360, and 370 from the PCs 350, 360, and 370, and obtains display presence/absence information from the display control unit 74 of the projector 300. The operation procedure storage unit 91 extracts procedure information and stores the extracted procedure information into the secondary storage unit 4 included in the server 380. The processing of the operation procedure storage unit 91 is similar in outline to that of the operation procedure acquisition unit 21 described in FIGS. 7 and 8.

The operation procedure storage unit 91 transmits the procedure information stored in the secondary storage unit 4 to the operation procedure acquisition unit 71 of the projector 300 and the accessibility information acquisition unit 93 in the server 380.

The accessibility information acquisition unit 93 obtains accessibility information about a PC or PCs corresponding to PC information (for example, the network addresses of the PCs) included in the procedure information obtained from the operation procedure storage unit 91. The accessibility information acquisition unit 93 then transmits the obtained accessibility information to the execution determination unit 73.

The resource information storage unit 92 obtains resource information from the information apparatuses connected via the network 340 and stores the resource information into the secondary storage unit 4 in the server 380. The resource information storage unit 92 transmits the resource information stored in the secondary storage unit 4 to the resource information acquisition unit 72 of the projector 300 via the network 340.

The user information storage unit 94 stores user information received from the PC 350 into the secondary storage unit 4. The user information storage unit 94 can receive user information from the PCs 350, 360, and 370 and store the user information in advance. The user information storage unit 94 may be configured to obtain user information about a specific PC, for example, according to a request from the projector 300.

The user information storage unit 94 transmits the user information stored in the secondary storage unit 4 to the display control unit 74 of the projector 300 via the network 340.

As described above, in the present exemplary embodiment, the procedure information, the accessibility information, and the resource information are stored in the dedicated server in a centralized manner. If there is a plurality of display control apparatuses (projectors and/or displays), all the display control apparatuses can thus obtain the same operation procedures. This improves convenience.

(Other Exemplary Embodiments)

An exemplary embodiment can be implemented by supplying a program for implementing one or more of the functions of the foregoing exemplary embodiments to a system or an apparatus via a network or a recording medium, and reading and executing the program by one or more processors in a computer(s) of the system or apparatus. An exemplary embodiment can be implanted by a circuit (for example, ASIC) that implements one or more of the functions.

According to an exemplary embodiment, it is possible to reduce time and labor at the time when displaying a video image based on designated display data.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-032211 filed Feb. 21, 2014, which is hereby incorporated by reference herein in its entirety.

What is claimed is:

1. A projector comprising:
a processor; and
a memory for storing instructions to be executed by the processor, wherein when the instructions stored in the memory are executed by the processor, the projector functions as:
a storage unit configured to store a plurality of pieces of user operation information each indicating one or more user operations performed by a user on an information processing apparatus;
a specification unit configured to specify, from among a plurality of information processing apparatuses on which the user operation indicated by the plurality of pieces of user operation information is performed, one or more information processing apparatuses capable of communicating with the projector;
a projection unit configured to project an image representing, as designatable user operation information, one or more pieces of user operation information, among the plurality of pieces of user operation information stored in the storage unit, indicating one or more user operations performed on an information processing apparatus specified by the specification unit as an information processing apparatus capable of communicating with the projector and not representing, as the designatable user operation information, one or more pieces of user operation information, among the plurality of pieces of user operation information stored in the storage unit, indicating one or more user operations performed on an information processing apparatus which is not specified by the specification unit as an information processing apparatus capable of communicating with the projector; and
an obtain unit configured to obtain image data corresponding to user operation information that is designated by a designation operation, among the one or more pieces of user operation information which are represented as the designatable user operation information on the image projected by the projection unit, wherein the obtain unit obtains the image data from an information processing apparatus on which a user operation corresponding to the designated user operation information is performed,
wherein the projection unit projects the image based on the image data obtained by the obtain unit.

2. The projector according to claim 1, wherein the projector further functions as a user ID obtain unit configured to obtain user identification information of one information processing apparatus which controls the projector, and
wherein the image does not represent one or more pieces of user operation information specified based on the user identification information obtained by the user ID obtain unit.

3. The projector according to claim 1, wherein the projection unit projects the image indicating the one or more pieces of user operation information and a time when one or more user operations corresponding to the one or more pieces of user operation information is performed.

4. The projector according to claim 1, wherein the projection unit is configured to project the image in a distinguishing manner whether each of the one or more user operations corresponding to the one or more pieces of user operation information is a user operation based on an application executable by the information processing apparatus.

5. The projector according to claim 1, wherein the specification unit is further configured to specify application information indicating an application executable by the one or more information processing apparatuses capable of communicating with the projector, and
wherein the projection unit is configured to project on the image indicating the one or more pieces of user operation information which are determined to be executable based on the application information from among the plurality of pieces of user operation information.

6. A method for controlling a projector, comprising:
storing a plurality of pieces of user operation information each indicating one or more user operations performed by a user on an information processing apparatus;
specifying, from among a plurality of information processing apparatuses on which the user operation indicated by the plurality of pieces of user operation information is performed, one or more information processing apparatuses capable of communicating with the projector;
projecting, by the projector, an image representing, as designatable user operation information, one or more pieces of user operation information, among the plurality of pieces of user operation information stored in the storing, indicating one or more user operations performed on an information processing apparatus specified by the specifying as an information processing apparatus capable of communicating with the projector and not representing, as the designatable user operation information, one or more pieces of user operation information, among the plurality of pieces of user operation information stored in the storing, indicating one or more user operations performed on an information processing apparatus which is not specified by the specifying as an information processing apparatus capable of communicating with the projector;
obtaining image data corresponding to user operation information that is designated by a designation operation, among the one or more pieces of user operation information which are represented as the designatable user operation information on the image projected by the projector, wherein the obtaining obtains the image data from an information processing apparatus on which a user operation corresponding to the designated user operation information is performed; and
projecting, by the projector, the image based on the image data obtained in the obtaining step.

7. A storage medium storing computer executable instructions readable by a computer in a projector, the computer executable instructions comprising instructions for:
storing a plurality of pieces of user operation information each indicating one or more user operations performed by a user on an information processing apparatus;
specifying, from among a plurality of information processing apparatuses on which the user operation indicated by the plurality of pieces of user operation information is performed, one or more information processing apparatuses capable of communicating with the projector;

projecting, by the projector, an image representing, as designatable user operation information, one or more pieces of user operation information, among the plurality of pieces of user operation information stored in the storing, indicating one or more user operations performed on an information processing apparatus specified by the specifying as an information processing apparatus capable of communicating with the projector and not representing, as the designatable user operation information, one or more pieces of user operation information, among the plurality of pieces of user operation information stored in the storing, indicating one or more user operations performed on an information processing apparatus which is not specified by the specifying as an information processing apparatus capable of communicating with the projector;

obtaining image data corresponding to user operation information that is designated by a designation operation, among the one or more pieces of user operation information which are represented as the designatable user operation information on the image projected by the projector, wherein the obtaining obtains the image data from an information processing apparatus on which a user operation corresponding to the designated user operation information is performed; and projecting, by the projector, the image based on the image data obtained in the obtaining step.

8. The projector according to claim 1, wherein the user operation information is stored in the storage unit at a timing when an image projected by the projection unit is changed.

9. The projector according to claim 1, wherein the user operation information includes information for identifying one or more applications which are activated.

10. The projector according to claim 1, wherein the user operation information includes information for identifying an input device configured to input a user operation to the information processing apparatus and an operation via the input device.

* * * * *